United States Patent
Eaton, Jr. et al.

(10) Patent No.: US 6,410,148 B1
(45) Date of Patent: Jun. 25, 2002

(54) SILICON BASED SUBSTRATE WITH ENVIRONMENTAL/ THERMAL BARRIER LAYER

(75) Inventors: Harry Edwin Eaton, Jr., Woodstock; William Patrick Allen, Portland, both of CT (US); Nathan S. Jacobson, Westlake, OH (US); Nanottam P. Bansal, North Olmsted, OH (US); Elizabeth J. Opila, Lakewood, OH (US); James L. Smialek, Strongsville, OH (US); Kang N. Lee, Westlake, OH (US); Irene T. Spitsberg, Loveland, OH (US); Hongyu Wang; Peter Joel Meschter, both of Niskayuna, NY (US); Krishan Lal Luthra, Schenectady, NY (US)

(73) Assignees: General Electric Co., New York; United Technologies Corp., DE (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/292,349

(22) Filed: Apr. 15, 1999

(51) Int. Cl.$^7$ ............................... B32B 9/00; B32B 9/04
(52) U.S. Cl. ..................... 428/446; 428/448; 428/472; 428/472.2; 428/701; 428/702
(58) Field of Search .................. 428/325, 446, 428/448, 469, 472, 472.2, 632, 633, 701, 702, 621, 629; 501/8, 32, 88, 89

(56) References Cited

U.S. PATENT DOCUMENTS

| | | | |
|---|---|---|---|
| 5,164,266 A | 11/1992 | Kita | |
| 5,214,004 A | 5/1993 | Bansal | |
| 5,332,619 A * | 7/1994 | Lacoste et al. | 428/245 |
| 5,391,404 A | 2/1995 | Lee et al. | |
| 5,429,796 A * | 7/1995 | Larsen | 420/590 |
| 5,741,596 A | 4/1998 | Skowronski et al. | |
| 5,985,470 A | 11/1999 | Spitsberg et al. | |

* cited by examiner

Primary Examiner—Blaine Copenheaver
Assistant Examiner—Bryant Young
(74) Attorney, Agent, or Firm—Bachman & LaPointe, P.

(57) ABSTRACT

A barrier layer for a silicon containing substrate which inhibits the formation of gaseous species of silicon when exposed to a high temperature aqueous environment comprises a barium-strontium alumino silicate.

53 Claims, 3 Drawing Sheets

SILICON BASED SUBSTRATE WITH ENVIRONMENTAL/ THERMAL BARRIER LAYER

The invention described herein was made in the performance of work under NASA Contract No. NAS3-26385, and is subject to the provisions of Section 305 of the National Aeronautics and Space Act of 1958, as amended (42 U.S.C. 2457).

BACKGROUND OF THE INVENTION

The present invention relates to an article comprising a substrate containing silicon and a barrier layer which functions as a protective environmental/ thermal barrier coating and, more particularly, a barrier layer which inhibits the formation of gaseous species of Si, particularly $Si(OH)_x$ when the article is exposed to a high temperature, aqueous (water and/or steam) environment.

Ceramic materials containing silicon and metal alloys containing silicon have been proposed for structures used in high temperature applications as, for example, gas turbine engines, heat exchangers, internal combustion engines, and the like. A particular useful application for these materials is for use in gas turbine engines which operate at high temperatures in aqueous environments. It has been found that these silicon containing substrates can recede and lose mass as a result of a formation volatile Si species, particularly $Si(OH)_x$ and SiO when exposed to high temperature, aqueous environments. For example, silicon carbide when exposed to a lean fuel environment of approximately 1 ATM pressure of water vapor at 1200° C. will exhibit weight loss and recession at a rate of approximately 6 mils per 1000 hrs. It is believed that the process involves oxidation of the silicon carbide to form silica on the surface of the silicon carbide followed by reaction of the silica with steam to form volatile species of silicon such as $Si(OH)_x$. Naturally it would be highly desirable to provide a external barrier coating for silicon containing substrates which would inhibit the formation of volatile silicon species, $Si(OH)_x$ and SiO, and thereby reduce recession and mass loss.

Accordingly, it is the principle object of the present invention to provide an article comprising a silicon containing substrate with a barrier layer which inhibits the formation of gaseous species of Si, particularly $Si(OH)_x$, when the article is exposed to a high temperature, aqueous environment.

A second objective of this invention is to provide an article comprising a substrate with a barrier layer providing thermal protection, such layer closely matching the thermal expansion of the substrate.

It is a further object of the present invention to provide a method for producing an article as aforesaid.

SUMMARY OF THE INVENTION

The present invention relates to an article comprising a silicon containing substrate having a barrier layer on the substrate, wherein the barrier layer functions to both inhibit the formation of undesirable gaseous species of silicon when the article is exposed to a high temperature, aqueous environment and to provide thermal protection. By high temperatures is meant the temperature at which the Si in the substrate forms $Si(OH)_x$ and/or SiO in an aqueous environment. By aqueous environment is meant a water and/or steam environment. The silicon containing composite is preferably a ceramic or metal alloy containing silicon. The external barrier layer is characterized by a coefficient of thermal expansion which is within plus or minus 3.0 ppm per degree centigrade of the coefficient of expansion of the silicon containing substrate. The preferred barrier layer in accordance with the present invention is a barium aluminosilicate and, preferably, a barium-alkaline earth aluminosilicate wherein the alkaline earth metal is ideally strontium. In a preferred embodiment of the present invention the article can include one or more intermediate layers between the silicon based substrate and the barrier layer. The intermediate layer(s) serve(s) to provide enhanced adherence between the barrier layer and the substrate and/or to prevent reactions between the barrier layer and the substrate.

The invention further relates to a method for producing an article comprising a silicon containing substrate and a barrier layer which inhibits the formation of gaseous species of silicon and/or provides thermal protection when the article is exposed to a high temperature, aqueous environment as defined above.

Further objects and advantages of the present invention will appear hereinbelow from the following detailed description.

DETAILED DESCRIPTION

Figure 1:
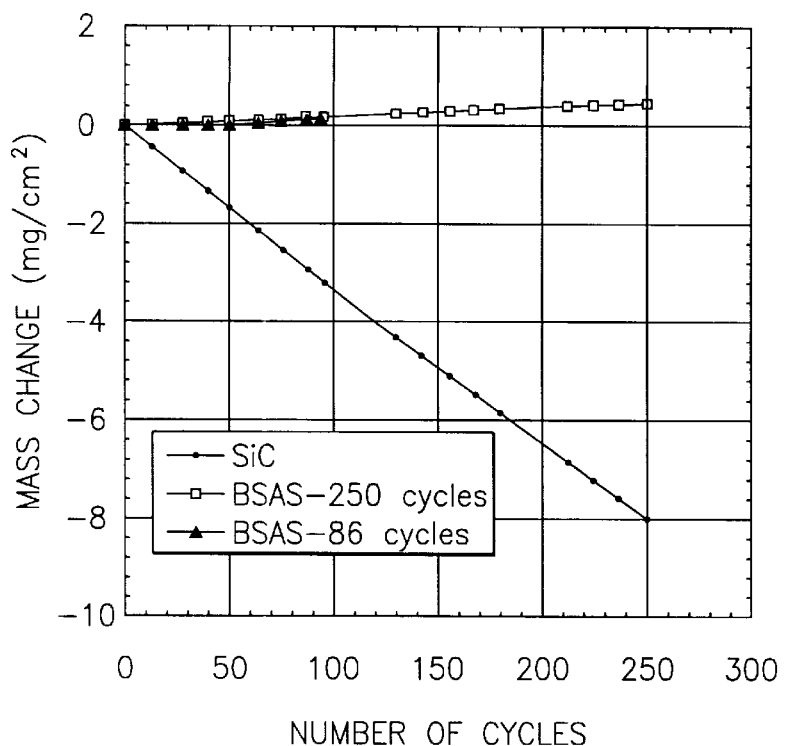
FIG. 1 is a graph showing the stability of the barrier layer of the present invention with respect to recession and mass loss.

The present invention relates to an article comprising a silicon containing substrate and a barrier layer, wherein the barrier layer inhibits the formation of gaseous species of silicon when the article is exposed to a high temperature, aqueous environment. The invention also relates to a method for producing the aforesaid article. In addition, it should be appreciated that while the barrier is particularly directed to an environmental barrier layer, the barrier layer also functions as a thermal barrier layer and thus the present invention broadly encompasses the use of environmental/ thermal barrier layers on silicon containing substrates and on substrates having comparable thermal expansion coefficients.

According to the present invention, the silicon containing substrate may be a silicon containing ceramic substrate or a silicon containing metal alloy. In a preferred embodiment, the silicon containing substrate is a silicon containing ceramic material as, for example, silicon carbide, silicon nitride, silicon carbon nitride, silicon oxynitride and silicon aluminum oxynitride. In accordance with a particular embodiment of the present invention, the silicon containing ceramic substrate comprises a silicon containing matrix with reinforcing such as fibers, particles, and the like and, more particularly, a silicon based matrix which is fiber-reinforced. Particularly suitable ceramic substrates are a silicon carbide coated silicon carbide fiber-reinforced silicon carbide particle and silicon matrix, a carbon fiber-reinforced silicon carbide matrix and a silicon carbide fiber-reinforced silicon nitride matrix. Particularly useful silicon-metal alloys for use as substrates for the article of the present invention include molybdenum-silicon alloys, niobium-silicon alloys, and other Si containing alloys having a coefficient of thermal expansion compatable with the barrier layer of the present invention.

Barrier layers particularly useful in the article of the present invention include alkaline earth metal aluminosilicates. In accordance with a preferred embodiment, barium aluminosilicates, barium-alkaline earth metal aluminosilicates and, particularly, barium-strontium aluminosilicates are preferred. In a particular embodiment, the barrier layer comprises from about 0.00 to 1.00 mole BaO, from about 0.00 to 1.00 mole of an oxide of a second alkaline earth metal, preferably SrO, about 1.00 mole $Al_2O_3$ and about 2.00 mole $SiO_2$, wherein the total of the BaO and the second alkaline earth metal or SrO is about 1.00 mole. The preferred barrier layer of the present invention comprises from about 0.10 mole to about 0.9 mole, preferably 0.25 to about 0.75 mole BaO, 0.1 mole to about 0.9 mole, preferably 0.25 to about 0.75 SrO, 1.00 mole $Al_2O_3$ and about 2.00 mole $SiO_2$ wherein the BaO and SrO total is about 1.00 mole. A particularly suitable barrier layer for use on silicon containing ceramic compositions in the article of the present invention comprises about 0.75 mole BaO, about 0.25 mole SrO, about 1.00 mole $Al_2O_3$, and about 2.00 mole $SiO_2$.

It is an important feature of the present invention to maintain compatibility between the coefficient of thermal expansion of the silicon containing substrate and the barrier layer. In accordance with the present invention it has been found that the coefficient of thermal expansion of the barrier layer should be within ±3.0 ppm per degrees centigrade, preferably ±0.5 ppm per degrees centigrade, of the coefficient of thermal expansion of the silicon containing substrate. When using a silicon containing ceramic substrate such as a silicon carbide or a silicon nitride matrix with or without reinforcing fibers as described above in combination with the preferred barium-strontium aluminosilicate barrier layer of the present invention, it is necessary to develop a stable crystallographic structure in the barrier layer of at least 50% by volume celsian in order to insure both structural integrity of the barrier layer and the desired thermal compatibility with respect to expansion coefficient between the silicon containing substrate and the barrier layer. The crystallographic structure of the barium-strontium aluminosilicate barrier layer is obtained as a result of preferred processing application and heat treating processing steps as will be described hereinbelow.

The barrier layer should be present in the article at a thickness of greater than or equal to about 0.5 mils (0.0005 inch), preferably between about 3 to about 30 mils and ideally between about 3 to about 5 mils. The barrier layer may be applied to the silicon based substrate by any suitable manner known in the art, however, it is preferable that the barrier layer be applied by thermal spraying as will be described hereinbelow.

In a further embodiment of the article of the present invention, an intermediate layer can be provided between the silicon containing substrate and the barrier layer. The intermediate layer(s) serve(s) to provide enhanced adhesion between the barrier layer and the substrate and/or to prevent reactions between the barrier layer and the substrate. The intermediate layer consists of, for example, $SiO_2$, mullite, mullite-barium strontium aluminosilicate, mullite-yttrium silicate, mullite-calcium aluminosilicate, and silicon metal. Mullite has been found to be a particularly useful intermediate layer; however, mullite by itself tends to be cracked as the result of thermal spray fabrication processing. Accordingly, it is preferred that the barrier layer comprises mullite-barium strontium aluminosilicate, mullite-yttrium silicate, or mullite-calcium aluminosilicate in an amount of between about 40 to 80 wt. % mullite and between about 20 to 60 wt. % barium strontium aluminosilicate or yttrium silicate or calcium aluminosilicate. The thickness of the intermediate layer is typical to those described above with regard to the barrier layer and the intermediate layer may likewise be disposed in any manner known in the prior art, however, preferably by thermal spraying as described hereinbelow.

In addition to the intermediate layer, a bond layer may be provided between the silicon containing substrate and the intermediate layer. A suitable bond layer includes silicon metal in a thickness of 3 to 6 mils. Alternatively, the silicon containing substrate may be pre-oxidized to provide a $SiO_2$ bond layer prior to application of the intermediate layer.

The method of the present invention comprises providing a silicon containing substrate and applying a barrier layer wherein the barrier layer inhibits the formation of gaseous species of silicon when the article is exposed to a high temperature, aqueous environment. In accordance with the present invention it is preferred that the barrier layer be applied by thermal spraying. It has been found that the barrier layer should be thermal sprayed at a temperature of between about 870° C. to 1200° C. in order to help equilibrate the as-sprayed, splat quenched, microstructure and to provide a means to manage stresses which control delamination. When the article being prepared in accordance with the method of the present invention is a silicon containing ceramic with a barium strontium aluminosilicate barrier layer, it is preferred that the barium strontium aluminosilicate barrier layer have celsian crystallographic structure in an amount of at least 50% by volume in the barrier layer. The formation of the celsian crystallographic structure insures compatibility between the coefficient of thermal expansion of the silicon containing ceramic and the barium strontium aluminosilicate barrier layer as described above.

The silicon containing substrate should be cleaned prior to application of the barrier layer to remove substrate fabrication contamination. It is preferred that the silicon based substrate be subjected to a grit blasting step prior to application of the barrier layer. The grit blasting step must be carried out carefully in order to avoid damage to the surface of the silicon-containing substrate such as silicon carbide fiber reinforced composite. It has been found that the particles used for the grit blasting should be hard enough to remove the undesired contamination but not as hard as the substrate material to prevent erosive removal of the substrate. Further, the particles must be small to prevent impact damage to the substrate. When processing an article comprising a silicon carbide ceramic composite substrate, it has been found that the grit blasting should be carried out with $Al_2O_3$ particles, preferably of a particle size of $\leq 30$ microns and, preferably, at a velocity of about 150 to 200 m/sec. In addition to the foregoing, it may be particularly useful to preoxidize the silicon based substrate prior to application of the intermediate and/or barrier layer in order to improve adherence. It has been found that bond layers of between 100 nanometers to 2000 nanometers are preferred. $SiO_2$ bond layers of the desired thickness can be achieved by preoxidizing the silicon-carbide substrate at a temperature of between 800° C. to 1200° C. for about 15 minutes to 100 hours.

The silicon bond layer may be applied directly to the grit blasted surface by thermal spraying at approximately 870° C. to a thickness of 3 to 6 mils.

Intermediate layers may be applied between the substrate and/or bond layer and the barrier layer or between the bond layer and barrier layer by thermal spraying in the same manner described above with respect to the barrier layer. As noted above, the preferred intermediate layers include mullite, mullite-barium strontium aluminosilicate, mullite-yttrium silicate, and mullite-calcium aluminosilicate.

After application of the desired layers to the silicon-based substrate material, the article is subjected to a heat treatment step in order to provide stress relief to the thermal sprayed structure, to promote bonding between the sprayed powder particles and between the layers and the substrate, and to develop the celsian phase in the BSAS barrier layer which is essentially amorphous in the as sprayed condition. The heat treatment step is carried out at a temperature of about 1250° C. for about 24 hours.

The advantages of the article of the present invention will become clear from consideration of the following examples.

EXAMPLE 1

FIG. 1 shows a comparison of a hot pressed bulk specimen of BSAS, of composition 0.75 BaO.0.25 SrO.$Al_2O_3$.2 $SiO_2$ in comparison to silicon carbide thermal cycle tested 250 cycles between room temperature and 1200° C. in a simulated combustion environment of high steam, lean fuel conditions. The results show 8 mg/$cm^2$ weight loss for the silicon carbide while the BSAS gains a very small amount of weight ~0.4 mg/$cm^2$. The results show that silicon carbide is not stable to this environment and that the BSAS system is much more stable.

EXAMPLE 2

Figure 2:
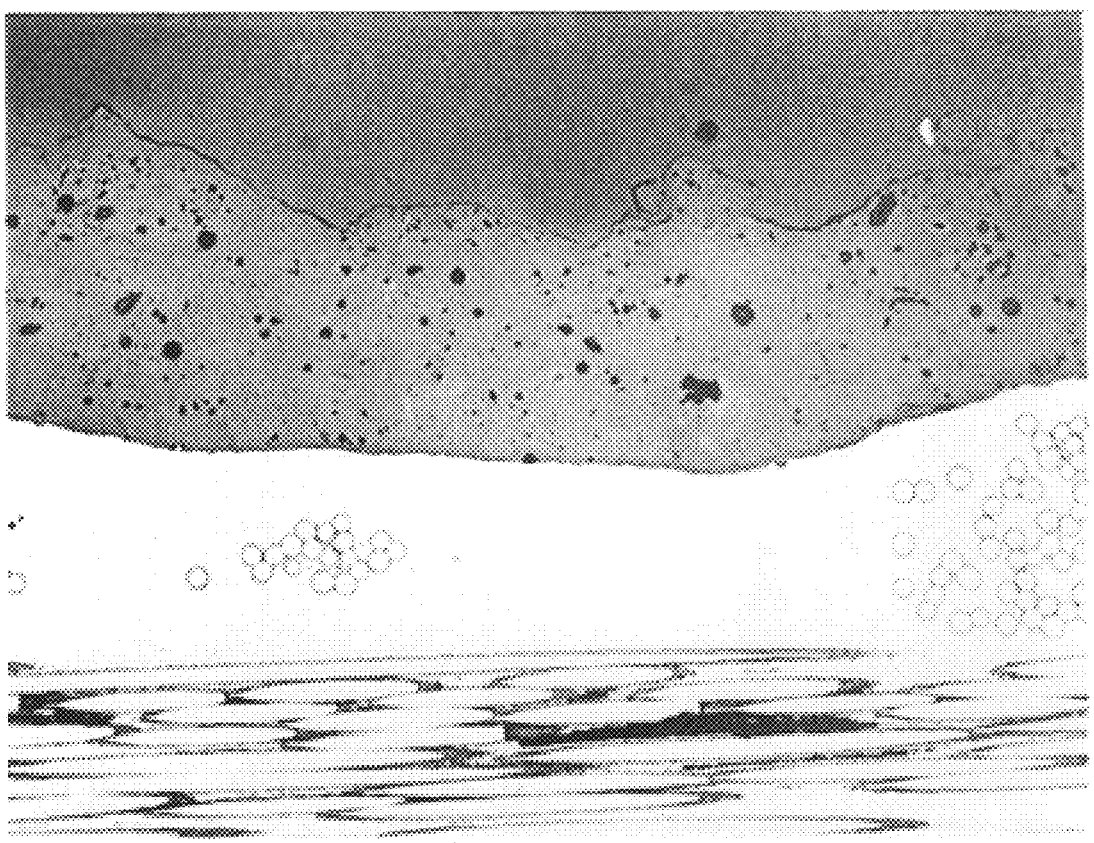
FIG. 2 is a photomicrograph through a sample of the barrier layer of the present invention on a silicon carbide substrate.

FIG. 2 is a cross section of a 4 mil thick BSAS of composition 0.75 BaO.0.25 SrO.$Al_2O_3$.2 $SiO_2$ coating on SiC composite. The BSAS was thermal sprayed onto the silicon carbide composite using the following parameters:

| Parameter | Setting | |
|---|---|---|
| Plasma torch | Metco 3M | |
| Nozzle | GH | |
| Anode | std. | |
| Powder port | Metco #2 | |
| Primary gas | Ar@80 Metco gage | |
| Secondary gas | H2@8 Metco gage | |
| Substrate temp. | 850° C. | |
| Carrier gas | Ar@37 Metco gage | |
| Powder feed | 15 to 25 gpm | |
|  | Intermed. | Surface |
| Power | 30 kw | 25 kw |
| Stand-off | 2.5–3" | 5" |

Prior to coating the substrate was cleaned by grit blasting with 27 micron alumina particles at an impact velocity of 150 to 200 mps. As can be seen from FIG. 2, the invention results in an excellent barrier layer structure.

EXAMPLE 3

Figure 3:
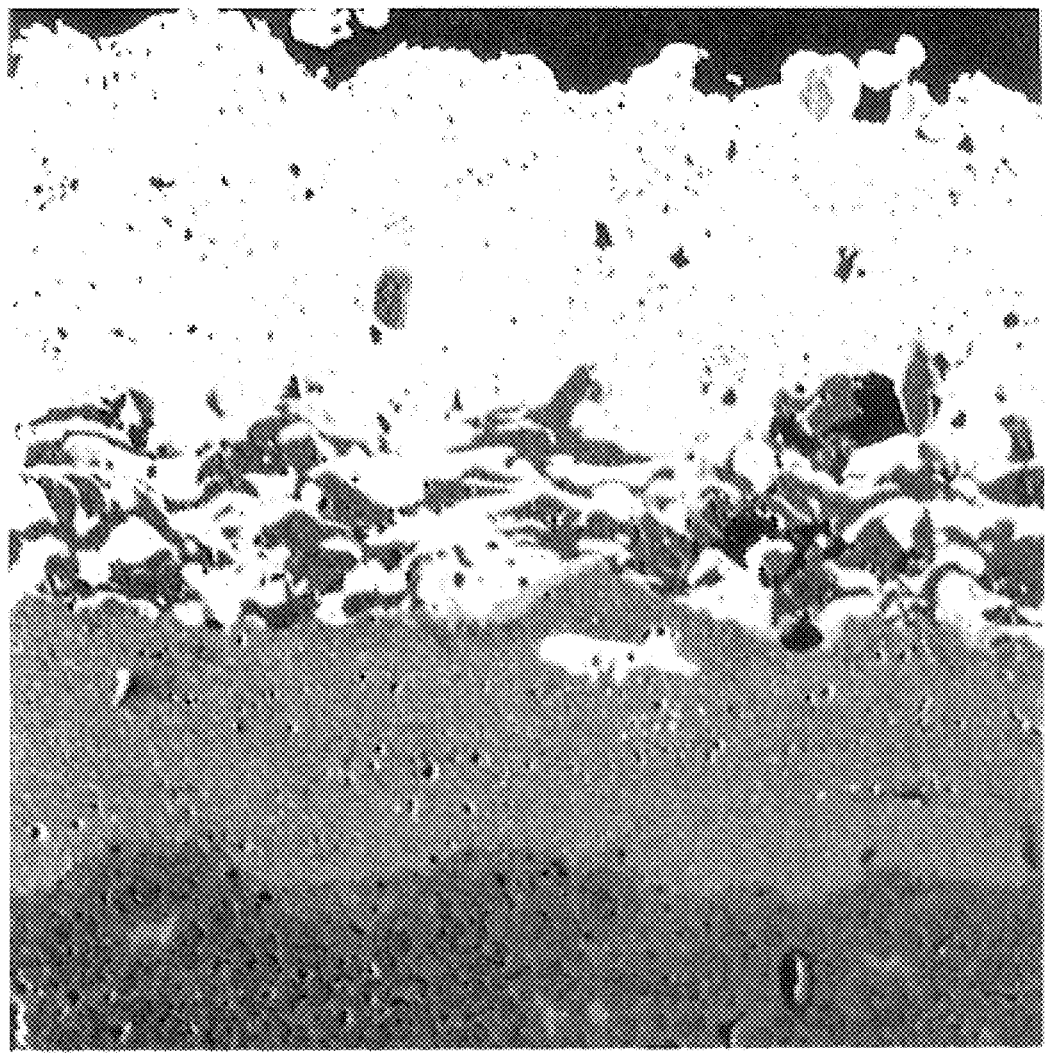
FIG. 3 is a photomicrograph of a sample of the barrier layer of the present invention applied to an intermediate layer on a silicon carbide substrate.

FIG. 3 is a cross sectional view of a BSAS of composition 0.75 BaO.0.25 SrO.$Al_2O_3$.2 $SiO_2$ barrier layer on a mullite/BSAS intermediate layer of 4±1 mils thickness on a silicon layer on silicon carbide composite. The coating was fabricated using the following parameters.

| Plasma torch | Metco 3M | | |
|---|---|---|---|
| Nozzle | GH | | |
| Anode | std. | | |
| Powder port | Metco #2 | | |
| Primary gas | Ar@80 Metco gage | | |
| Secondary gas | H2@8 Metco gage | | |
| Substrate temp. | 850° C. | | |
| Carrier gas | Ar@37 Metco gage | | |
| Powder feed | 15 to 25 gpm | | |
|  | Interface | Intermed. | Surface |
| Power | 25 kw | 30 kw | 25 kw |
| Stand-off | 4" | 2.5–3" | 5" |

Prior to coating the substrate was cleaned by grit blasting with 27 micron alumina particles at an impact velocity of 150 to 200 mps. As can be seen from FIG. 3, the invention results in an excellent barrier layer structure.

EXAMPLE 4

Coatings of the BSAS (barium strontium aluminosilicate) based barrier layer coating system were fabricated onto silicon carbide composite substrates having an intermediate layer as indicated below and were exposed along with an uncoated silicon carbide composite substrate (98-17A) to high pressure, combustion environment, burner rig testing similar to conditions that occur in gas turbines engines. The BSAS coatings on all samples had the following composition: 0.75 BaO.0.25 SrO.$Al_2O_3$.2 $SiO_2$. The BSAS coatings were 4±1 mils in thickness and the intermediate layers were also 4±1 mils in thickness and were applied by thermal spraying as indicated below. These coatings consisted of variations of BSAS on mullite (98-17C) and BSAS on mullite plus BSAS (98-17B and 98-17D). Testing occurred using conditions of 1200° C. test temperature, 200 hours exposure time, a fuel to air ratio of 0.053, and 6 atm pressure. After 200 hours exposure the uncoated substrate exhibited approximately 65 mg weight loss compared with weight gain of the coated coupons demonstrating that the coatings protected the substrate based on weight change data. No bond coat was used for these specimens. Thermal spray parameters were:

| Parameter | Setting | |
|---|---|---|
| Plasma torch | Electro-plasma 03CA | |
| Nozzle | 03CA-27 | |
| Anode | 03CA-167 | |
| Powder port | ext. 900 | |
| Primary gas | Ar@14.4 SLM | |
| Secondary gas | He@9.8 SLM | |
| Substrate temp. | 1050–1250° C. | |
| Carrier gas | Ar@3–6 SLM | |
| Powder feed | 20 gpm | |
|  | Intermed. | Surface |
| Power | 45 kw | 45 kw |
| Stand-off | 4" | 4" |

Figure 4:
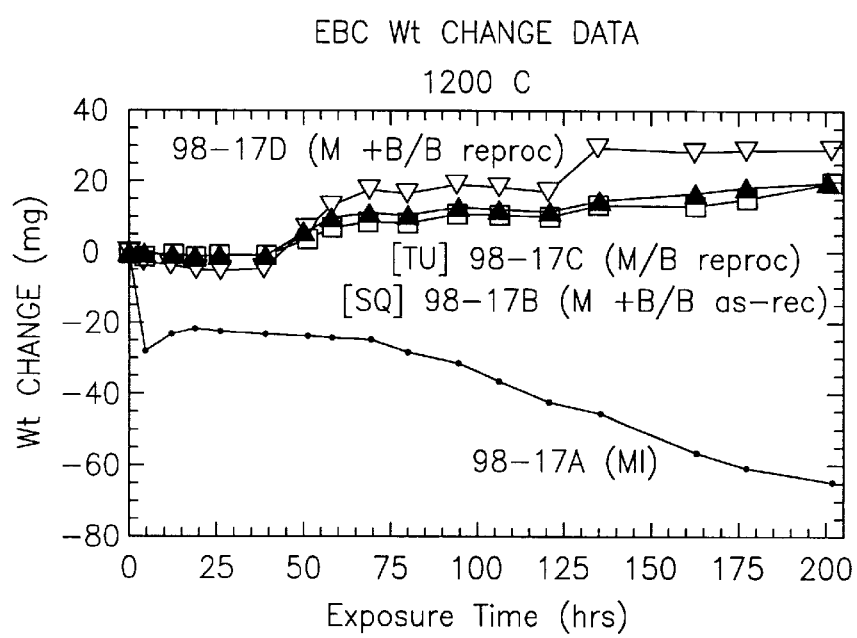
FIG. 4 demonstrates the effect of three specimens of the barrier layer of the present invention on weight loss in high temperature, aqueous environments.

The results are shown in FIG. 4 below which shows the effectiveness of the barrier layer of the present invention.

EXAMPLE 5

The coefficient of thermal expansion (CTE) was measured for BSAS systems of 0.75 BaO.0.25 SrO.$Al_2O_3$.2 $SiO_2$ having different celsian contents. Celsian content was determined by x-ray analysis of hot pressed coupons of BSAS. The celsian content affected the CTE as seen below.

| % Celsian Content | CTE |
|---|---|
| 5 | 8.1 |
| 25 | 7.4 |
| 95 | 5.2 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An article comprising:
    a substrate comprising silicon; and
    a gaseous species of Si formation inhibiting barrier layer, wherein the barrier layer is selected from the group consisting of (a) barium oxide, (b) barium aluminosilicate, (c) barium strontium aluminosilicate, (d) from about 0.00 to 1.00 moles BaO, from about 0.00 to 1.00 mole SrO, about 1.0 mole $Al_2O_3$ and about 2.00 mole $SiO_2$ wherein the total of BaO and SrO is about 1.00 mole and (e) from about 0.00 to 1.00 mole BaO, from about 0.00 to 1.00 mole of an oxide of a second alkaline earth metal, about 1.00 mole $Al_2O_3$ and about 2.00 mole $SiO_2$, wherein BaO plus the other alkaline earth metal oxide total 1 mole wherein the barrier layer has a crystallographic structure which is at least 50% by volume celsian and inhibits the formation of a gaseous species of Si when the article is exposed to a high temperature, aqueous environment.

2. An article according to claim 1 wherein the substrate is selected from the group consisting of a silicon containing ceramic and metal alloys containing silicon.

3. An article according to claim 2 wherein the substrate is a silicon containing ceramic selected from the group consisting of silicon carbide, silicon nitride, and silicon aluminum oxynitride.

4. An article according to claim 2 wherein the substrate is a composite comprising a silicon based matrix and a reinforcing particle.

5. An article according to claim 4 wherein said substrate is selected from the group consisting of silicon carbide fiber-reinforced silicon carbide matrix, carbon fiber-reinforced silicon carbide matrix and silicon carbide fiber-reinforced silicon nitride.

6. An article according to claim 2 wherein said substrate is a silicon containing metal alloy selected from the group consisting of molybdenum-silicon alloys, niobium silicon alloys, iron-silicon alloys, and iron-nickel-silicon based alloys.

7. An article according to claim 1 wherein the barrier layer comprises from about 0.10 mole to about 0.90 mole BaO and from about 0.10 mole to about 0.90 mole SrO.

8. An article according to claim 1 wherein the barrier layer comprises from about 0.25 mole to about 0.75 mole BaO and from about 0.25 mole to about 0.75 mole SrO.

9. An article according to claim 1 wherein the barrier layer comprises about 0.75 mole BaO and about 0.25 mole SrO.

10. An article according to claim 1 wherein the barrier layer comprises from about 0.10 mole to about 0.90 mole BaO and from about 0.10 mole to about 0.90 mole of a second alkaline earth oxide.

11. An article according to claim 12 wherein the barrier layer comprises from about 0.25 mole to about 0.75 mole BaO and from about 0.25 mole to about 0.75 mole of a second alkaline earth oxide.

12. An article according to claim 1 wherein the barrier layer comprises about 0.75 mole BaO and about 0.25 mole of a second alkaline earth oxide.

13. An article according to claim 1 wherein the coefficient of thermal expansion of the barrier layer is within ±3.0 ppm/°C. the coefficient of thermal expansion of the substrate.

14. An article according to claim 1 wherein the coefficient of thermal expansion of the barrier layer is within ±0.5 ppm/°C. the coefficient of thermal expansion of the substrate.

15. An article according to claim 1 wherein the barrier layer has a thickness of ≧0.5 mils (0.0005 inch).

16. An article according to claim 1 including an intermediate layer between the substrate and the barrier layer.

17. An article according to claim 16 wherein said intermediate layer is selected from the group consisting of $SiO_2$, mullite, mullite-barium strontium aluminosilicate, mullite-yttrium silicate, mullite-calcium aluminosilicate, and silicon metal.

18. An article according to claim 16 wherein said intermediate layer is selected from the group consisting of mullite, barium strontium aluminosilicate, mullite-yttrium silicate, calcium aluminosilicate and mixtures thereof.

19. An article according to claim 18 wherein said intermediate layer comprises mullite.

20. An article according to claim 18 wherein said intermediate layer comprises from about 40 to 80 wt. % mullite and from about 60 to 20 wt. % barium strontium aluminosilicate.

21. An article according to claim 18 wherein said intermediate layer comprises from about 40 to 80 wt. % mullite and from about 60 to 20 wt. % yttrium silicate.

22. An article according to claim 18 wherein said intermediate layer comprises from about 40 to 80 wt. % mullite and from about 60 to 20 wt. % calcium aluminosilicate.

23. An article according to claim 16 including a bond layer between the substrate and the intermediate layer.

24. An article according to claim 23 wherein the bond layer is silicon metal or $SiO_2$.

25. An article according to claim 16 wherein the intermediate layer has a thickness of ≧0.5 mils (0.0005 inch).

26. An article according to claim 1 wherein the barrier layer has a thickness of between about 3 to 30 mils.

27. An article according to claim 1 wherein the barrier layer has a thickness of between about 3 to 5 mils.

28. An article according to claim 16 wherein the intermediate layer has a thickness of 3 to 30 mils.

29. An article according to claim 16 wherein the intermediate layer has a thickness of 3 to 5 mils.

30. An article according to claim 23 wherein the bond layer has a thickness of between about 3 to 6 mils.

31. An article comprising:
    a substrate comprising silicon;
    a gaseous species of Si formation inhibiting barrier layer, wherein the barrier layer inhibits the formation of a gaseous species of Si when the article is exposed to a high temperature, aqueous environment; and
    an intermediate layer between the substrate and the barrier layer wherein the intermediate layer is selected from the group consisting of $SiO_2$, mullite, mullite-barium strontium aluminosilicate, mullite-yttrium silicate, mullite-calcium aluminosilicate, barium strontium aluminosilicate, calcium aluminosilicate, and silicon metal.

32. An article according to claim 31 wherein said intermediate layer comprises mullite.

33. An article according to claim 31 wherein said intermediate layer comprises from about 40 to 80 wt. % mullite and from about 60 to 20 wt. % barium strontium aluminosilicate.

34. An article according to claim 31 wherein said intermediate layer comprises from about 40 to 80 wt. % mullite and from about 60 to 20 wt. % yttrium silicate.

35. An article according to claim 31 wherein said intermediate layer comprises from about 40 to 80 wt. % mullite and from about 60 to 20 wt. % calcium aluminosilicate.

36. An article according to claim 31 wherein the barrier layer comprises barium.

37. An article according to claim 31 wherein the barrier layer comprises barium oxide.

38. An article according to claim 31 wherein the barrier layer comprises a barium aluminosilicate.

39. An article according to claim 31 wherein the barrier layer comprises a barium strontium aluminosilicate.

40. An article according to claim 31 wherein the barrier layer comprises from about 0.00 to 1.00 moles BaO, from about 0.00 to 1.00 mole SrO, about 1.0 mole $Al_2O_3$ and about 2.00 mole $SiO_2$, wherein the total of BaO and SrO is about 1.00 mole.

41. An article according to claim 31 wherein the barrier layer consists essentially of from about 0.00 to 1.00 mole BaO, from about 0.00 to 1.00 mole of an oxide of a second alkaline earth metal, about 1.00 mole $Al_2O_3$ and about 2.00 mole $SiO_2$, wherein BaO plus the other alkaline earth metal total 1 mole.

42. An article according to claim 31 wherein the barrier layer comprises from about 0.10 mole to about 0.90 mole BaO and from about 0.10 mole to about 0.90 mole SrO.

43. An article according to claim 31 wherein the barrier layer comprises from about 0.25 mole to about 0.75 mole BaO and from about 0.25 mole to about 0.75 mole SrO.

44. An article according to claim 31 wherein the barrier layer comprises about 0.75 mole BaO and about 0.25 mole SrO.

45. An article according to claim 41 wherein the barrier layer comprises from about 0.10 mole to about 0.90 mole BaO and from about 0.10 mole to about 0.90 mole second alkaline earth oxide.

46. An article according to claim 41 wherein the barrier layer comprises from about 0.25 mole to about 0.75 mole BaO and from about 0.25 mole to about 0.75 mole second alkaline earth oxide.

47. An article according to claim 41 wherein the barrier layer comprises about 0.75 mole BaO and about 0.25 mole second alkaline earth oxide.

48. An article according to claim 38 wherein the crystallographic structure of the barrier layer is at least 50% by volume celsian.

49. An article according to claim 39 wherein the crystallographic structure of the barrier layer is at least 50% by volume celsian.

50. An article according to claim 40 wherein the crystallographic structure of the barrier layer is at least 50% by volume celsian.

51. An article according to claim 41 wherein the crystallographic structure of the barrier layer is at least 50% by volume celsian.

52. An article according to claim 42 wherein the crystallographic structure of the barrier layer is at least 50% by volume celsian.

53. An article comprising:
a substrate comprising silicon; and
a gaseous species of Si formation inhibiting barrier layer, wherein the barrier layer consists essentially of BaO up to 1.00 mole, from about 0.00 to 1.00 mole of an oxide of a second alkaline earth metal, about 1.00 mole $Al_2O_3$ and about 2.00 mole $SiO_2$, wherein BaO plus the other alkaline earth metal oxide total 1 mole inhibits the formation of a gaseous species of Si when the article is exposed to a high temperature, aqueous environment.

* * * * *

UNITED STATES PATENT AND TRADEMARK OFFICE
CERTIFICATE OF CORRECTION

PATENT NO. : 6,410,148 B1
DATED : June 25, 2002
INVENTOR(S) : Harry Edwin Eaton, Jr. et al.

It is certified that error appears in the above-identified patent and that said Letters Patent is hereby corrected as shown below:

Column 8,
Line 3, change the dependency from "12" to -- 1 --.

Column 9,
Lines 36 and 39, change the dependency from "31" to -- 40 --.

Column 10,
Line 1, change the dependency from "31" to -- 40 --.

Signed and Sealed this

Twelfth Day of August, 2003

JAMES E. ROGAN
*Director of the United States Patent and Trademark Office*